US008640840B2

(12) United States Patent
Kawashima

(10) Patent No.: US 8,640,840 B2
(45) Date of Patent: Feb. 4, 2014

(54) TORQUE CONVERTER USING MAGNETIC VISCOUS FLUID AS WORKING FLUID

(71) Applicant: Jatco Ltd, Fuji (JP)

(72) Inventor: Kazunori Kawashima, Atsugi (JP)

(73) Assignee: Jatco Ltd, Fuji-shi (JP)

( * ) Notice: Subject to any disclaimer, the term of this patent is extended or adjusted under 35 U.S.C. 154(b) by 0 days.

(21) Appl. No.: 13/658,254

(22) Filed: Oct. 23, 2012

(65) Prior Publication Data
US 2013/0105265 A1   May 2, 2013

(30) Foreign Application Priority Data

Oct. 26, 2011   (JP) .................................. 2011-234775

(51) Int. Cl.
*F16H 45/00* (2006.01)
*F16H 41/32* (2006.01)
*F16D 47/06* (2006.01)
*F16D 37/02* (2006.01)
*F16D 33/18* (2006.01)

(52) U.S. Cl.
USPC .............. 192/3.28; 192/21.5; 60/326; 60/330

(58) Field of Classification Search
USPC ................................... 192/3.28, 21.5; 60/326
See application file for complete search history.

(56) References Cited

U.S. PATENT DOCUMENTS

| 2,643,748 A | * | 6/1953 | White, Jr. ...................... 192/3.28 |
| 2,838,912 A | * | 6/1958 | Grebe ............................. 60/326 |
| 2005/0230211 A1 | | 10/2005 | Weilant | |
| 2006/0254871 A1 | * | 11/2006 | Murty et al. ................. 192/21.5 |

FOREIGN PATENT DOCUMENTS

| JP | 60-30862 A | * | 2/1985 |
| JP | 02-042241 A | | 2/1990 |
| JP | 02-042242 A | | 2/1990 |
| JP | 07-002663 U | | 1/1995 |
| JP | 2012-137109 A | * | 7/2012 |

* cited by examiner

*Primary Examiner* — Richard M. Lorence
(74) *Attorney, Agent, or Firm* — Foley & Lardner LLP

(57) ABSTRACT

In a torque converter for performing torque transmission by circulating a working fluid between a pump impeller and a turbine runner, the working fluid is a magnetic viscous fluid; and in a torque converter housing, outside a circulation path of the working fluid, a yoke member connected to the pump impeller and provided with a coil and a magnetic member connected to the turbine runner are concentrically arranged with a predetermined space therebetween; and a magnetic circuit is established between the yoke member and the magnetic member upon energization of the coil.

13 Claims, 2 Drawing Sheets

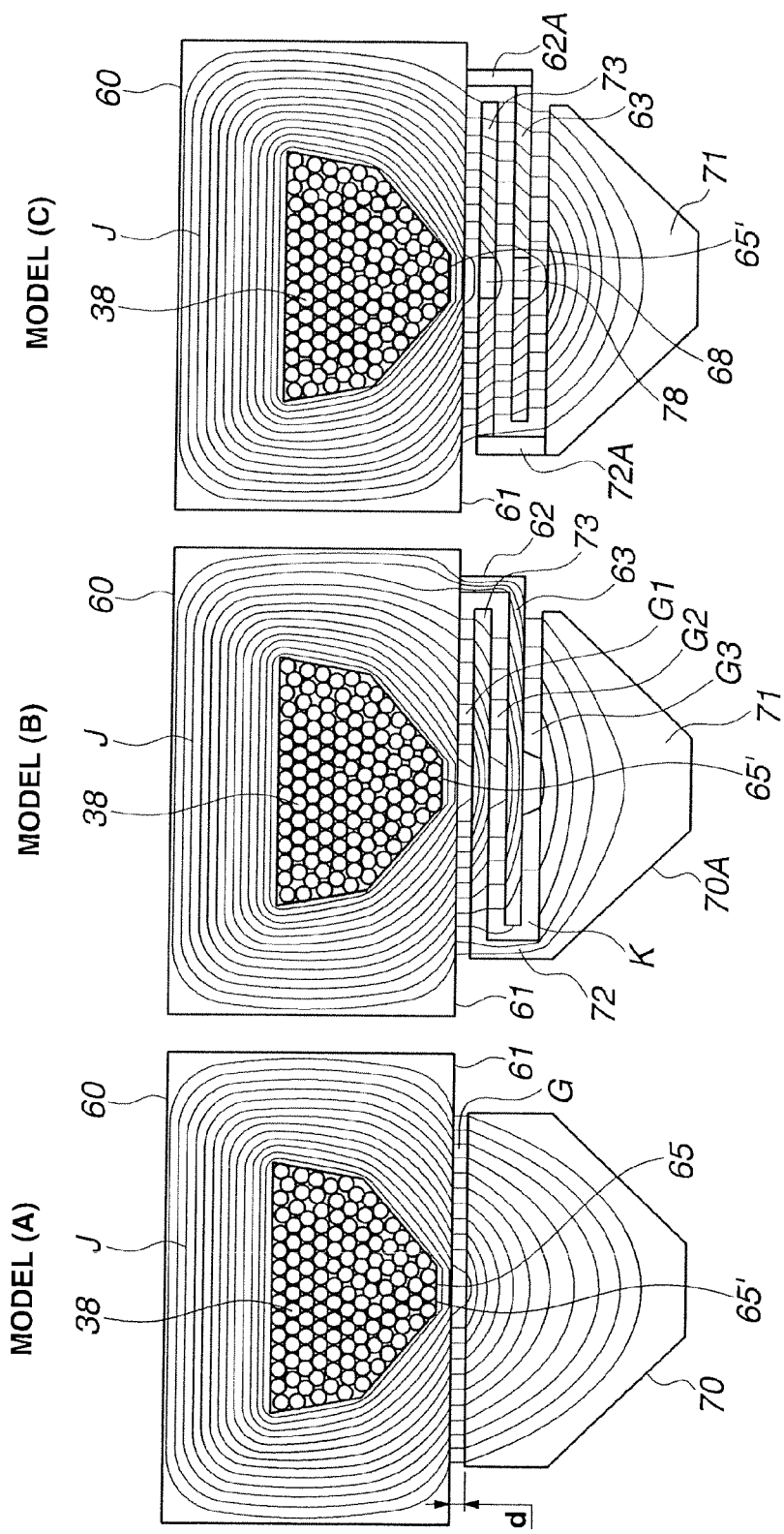

TORQUE CONVERTER USING MAGNETIC VISCOUS FLUID AS WORKING FLUID

BACKGROUND OF THE INVENTION

1. Field of the Invention

The present invention relates in general to torque converters used for a transmission device for a motor vehicle and more particularly to the torque converters of a type that uses a magnetic viscous fluid instead of oil as a working fluid.

2. Description of the Related Art

Hitherto, torque converters using oil (viz., transmission oil) as a working fluid have been used in various fields for the work of torque transmission. However, in recent years, use of a torque converter using a magnetic viscous fluid having a specific weight larger than that of the transmission oil has been seriously considered for the purpose of reducing its size and improving its transmission efficiency.

Particularly, since the torque converters used in a transmission device for a motor vehicle require a lockup function, realization of a lockup control with a high accuracy by a magnetic-force control by using the magnetic viscous fluid is expected.

Such torque converter using the magnetic viscous fluid is disclosed in Japanese Laid-open Utility Model Application (Jikkaihei) 07-002663.

In this known torque converter using the magnetic viscous fluid, an exciting coil is arranged to extend around the vicinity of an outer peripheral edge where a pump impeller and a turbine runner are arranged to face each other, an induction coil and an electromotive coil are sequentially provided on the outside of the exciting coil, and electric power is supplied from the electromotive coil to the exciting coil via the induction coil.

When the magnetic viscous fluid is magnetized by a magnetic force by the exciting coil, the yield stress (viz., apparent viscosity) of the magnetic viscous fluid is changed. Thus, in the known torque converter, a slip resistance between the pump impeller and the turbine runner is varied by changing the magnetic force, and when rotation on a loaded side has not sufficiently risen, the turbine runner is forced to generate a torque by using an inertia force of the magnetic viscous fluid without making the magnetic force control to the magnetic viscous fluid, and when the rotation on the loaded side has risen, the magnetic force is applied to the magnetic viscous fluid so as to reduce the slip between the pump impeller and the turbine runner.

SUMMARY OF THE INVENTION

However, it has been revealed that the arrangement in which the exciting coil is put around the vicinity of the outer peripheral edge where the pump impeller and the turbine runner are arranged to face each other fails to constitute a satisfied magnetic circuit, and thus a satisfied lockup condition of the torque converter is not established even if a large magnetic force is produced by the exciting coil.

On the contrary, since the magnetic flux of the magnetic viscous fluid has diverging characteristics, the following drawback tends to appear. That is, if the magnetic force from the exciting coil is applied to the magnetic viscous fluid at the outer peripheral edge where the pump impeller and turbine runner are arranged to face each other, a widen dispersion of the magnetic flux occurs, which causes the magnetic flux to leak into a fluid circuit of the torque converter thereby to give an influence of viscosity to a circulating flow and thus deteriorate the original torque amplification function of the torque converter.

Therefore, practical use of the known torque converter using the magnetic viscous fluid is actually difficult despite its aim.

Therefore, in view of the above-mentioned drawbacks inevitably possessed by the known torque converter, the present invention aims to provide a torque converter using a magnetic viscous fluid, which is capable of a reliable lock up and moreover, does not affect a circulating flow.

In accordance with a first aspect of the present invention, there is provided a torque converter for performing torque transmission by circulating a working fluid between a pump impeller and a turbine runner, the torque converter being characterized in that the working fluid is a magnetic viscous fluid; in a torque converter housing, outside a circulation path of the working fluid, a yoke member connected to the pump impeller and provided with a coil and a magnetic member connected to the turbine runner are concentrically arranged with a predetermined space therebetween; and a magnetic circuit is established between the yoke member and the magnetic member upon energization of the coil.

That is, the magnetic viscous fluid present in the space between the yoke member and the magnetic member is magnetized through control of electric power supplied to the coil, the yield stress (viz., apparent viscosity) of the magnetic viscous fluid is efficiently changed, and a slip between the pump impeller and the turbine runner can be eliminated when needed, and thus a lockup of the torque converter can be realized.

During the time for which the apparent viscosity of the magnetic viscous fluid in the space between the yoke member and the magnetic member is kept changed, a magnetic flux in the magnetic circuit does not affect the magnetic viscous fluid in a separated circulation path, and thus the torque amplification function by means of a circulation flow is not deteriorated.

In accordance with a second aspect of the present invention, there is provided a torque converter (1) which comprises a converter housing (10) adapted to be connected to a power source to be driven; a pump impeller (20) constituting part of the converter housing (10), the pump impeller having an annular yoke member (30) that constitutes a cylindrical outer body portion of the converter housing; a turbine runner (5) rotatably installed in the converter housing and adapted to be connected to a transmission device, the turbine runner being arranged to face the pump impeller; a magnetic viscous fluid filled in the converter housing (10) and serving as a working fluid, the magnetic viscous fluid being circulated between the pump impeller and the turbine runner for performing torque transmission therebetween; and a magnetic force applying mechanism (30, 38, 47, 48, 49) for changing a viscosity of the magnetic viscous fluid by applying the fluid with a magnetic force, the magnetic force applying mechanism being installed in the converter housing (10) at a position outside a circulation path of the magnetic viscous fluid, the magnetic force applying mechanism comprising a coil (38) concentrically held by the annular yoke member (30); and an annular plate unit (47, 48, 49) of magnetic material concentrically installed inside the coil (38) and connected to the turbine runner through a disc member (45), wherein upon energization of the coil (38), there is produced a magnetic circuit between the annular yoke member (30) and the annular plate unit (47, 48, 49).

BRIEF DESCRIPTION OF THE DRAWINGS

Other objects and advantages of the present invention will become apparent from the following description when taken in conjunction of the accompanying drawings, in which:

FIGS. 2A, 2B and 2C are enlarged sectional views of three simulation models that are practically applicable to the torque converter of the present invention.

DETAILED DESCRIPTION OF THE PRESENT INVENTION

Figure 1:
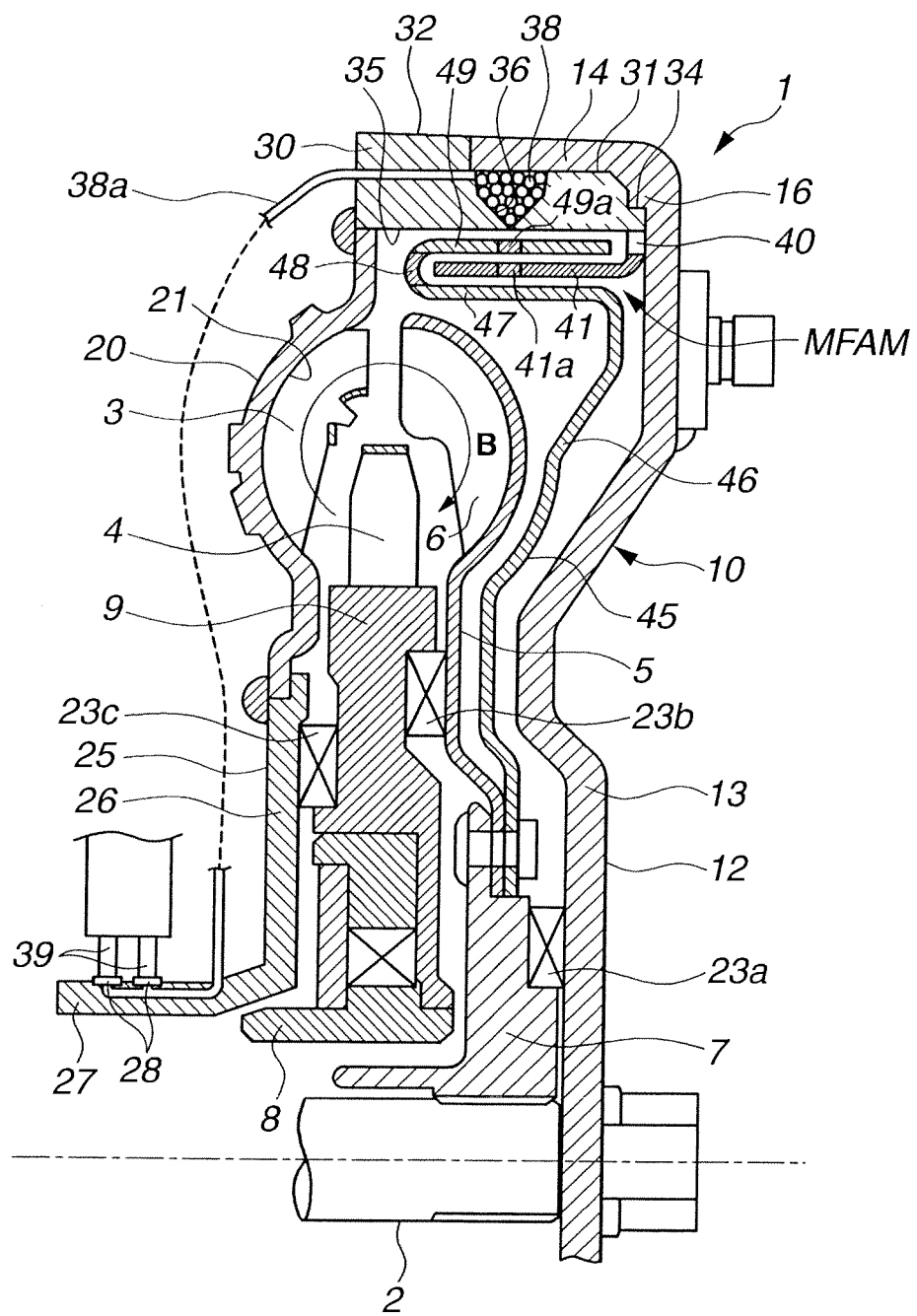
FIG. 1 is a sectional view of a torque converter to which the present invention is practically applied.

In the following, a torque converter of the present invention will be described in detail with reference to the accompanying drawings.

For ease of description, the following explanation uses various directional terms, such as right, left, upper, lower, rightward and the like. However, such terms are to be understood with respect to only the drawing or drawings on which a corresponding portion or part is shown.

Referring to FIG. 1, there is shown in a sectioned manner a torque converter 1 of the present invention. Although not shown the drawing, in FIG. 1, an engine is located at a right side of torque converter 1 and a transmission device is located at a left side of torque converter 1.

In torque converter 1, there are installed a pump impeller 20, a turbine runner 5 and a stator 4 that are arranged around a main shaft 2 rotatably held in a converter housing 10.

A magnetic force applying mechanism "MFAM" (or viscosity changing mechanism) is also arranged in converter housing 10, as will be described in detail hereinafter.

Converter housing 10 is composed of a drive plate 12 connected to a power source such as an engine or the like (not shown), pump impeller 20, a sleeve member 25 and a yoke portion 30 connecting drive plate 12 and pump impeller 20.

In convert housing 10, there is provided a circulation path for a circular flow "B" of the magnetic viscous fluid, that is defined by pump impeller 20, turbine runner 5 and stator 4.

Drive plate 12 has a drum portion 14 on an outer periphery of a disc portion 13. Yoke portion 30 is joined to drum portion 14 and extends in the axial direction. Yoke portion 30 has a smoothed inner cylindrical surface 35.

Pump impeller 20 has its outer peripheral edge connected by welding to a left end of yoke portion 30 and has in the middle in the radial direction an impeller blade holding concave portion 21 for holding a plurality of impeller blades 3. Pump impeller 20 has its inner peripheral edge connected by welding to sleeve member 25.

Sleeve member 25 is composed of a disc portion 26 having an outer peripheral edge connected to the inner peripheral edge of pump impeller 20 and a sleeve portion 27 extending axially in a direction away from drive plate 12 from the center of disc portion 26. Sleeve member 25 is rotatable at sleeve portion 27 on a fixed hollow shaft (not shown) that is coaxial with main shaft is 2.

Turbine runner 5 is provided with a plurality of turbine blades 6 that are arranged to face impeller blades 3 of pump impeller 20. Turbine runner 5 has an inner peripheral portion connected to an output hub 7 that is connected to main shaft 2 through a spline connection.

Denoted by numeral 45 is a disc member that is employed as part of magnetic force applying mechanism "MFAM". As shown, disc member 45 has its inner peripheral portion connected to output hub 7 and extends radially outward in a space defined between turbine runner 5 and disc portion 13 of drive plate 12.

Stator 4 is arranged between the group of impeller blades 3 and the group of turbine blades 6 and supported by stator base 9 that is rotatable in one direction by means of a one-way clutch 8.

The interior of converter housing 10 is filled with the magnetic viscous fluid that serves as a working fluid, and seals 23a, 23b, and 23c are provided between output hub 7 and disc portion 13 of drive plate 12, between turbine runner 5 and stator base 9, and between stator base 9 and disc portion 26 of sleeve member 25, respectively, so as to prevent leakage of the magnetic viscous fluid to the outside.

In converter housing 10, there is also arranged magnetic force applying mechanism "MFAM" (or viscosity changing mechanism) that is in collaboration with disc member 45. As shown, magnetic force applying mechanism "MFAM" is placed near yoke portion 30. The detail of this mechanism "MFAM" will be described below.

Yoke portion 30 is made of a magnetic body with a high magnetic permeability such as iron or the like and has a smoothed cylindrical inner surface 35 as described hereinabove.

The outer surface of yoke portion 30 forms a stepped shape having a first cylindrical surface 31 with a coil accommodating groove 36 formed therearound and covered by drum portion 14 of drive plate 12 and a second cylindrical surface 32 extending to the outer peripheral surface of drum portion 14.

As shown in FIG. 1, a left end of drum portion 14 is received on first cylindrical surface 31 while abutting against a space defined between first and second cylindrical surfaces 31 and 32 of yoke portion 30. That is, a right part of yoke portion 30 is intimately received in drum portion 14 of drive plate 12.

More specifically, a smaller diameter portion 34 provided at the right end of first surface 31 is intimately received in a cylindrical recess 16 provided on drive plate 12 at a junction part between disc portion 13 and drum portion 14, as shown. With this, a so-called centering location of yoke portion 30 relative to drive plate 12 is achieved.

Although not shown in the drawings, a plurality of connecting bolts are used for securing yoke portion 30 to drive plate 12, each connecting bolt penetrating through yoke portion 30 and drive plate 12 and engaging with a nut. If desired, drive plate 12 may have threaded bolt holes to engage with the connecting bolts. In this case, there is no need of using nuts, which promotes reduction in size of the torque converter.

Due to connection between yoke portion 30 and drive plate 12 by the connecting bolts, the stepped portion between first surface 31 and second surface 32 of yoke portion 30 is tightly connected to the open left end of drum portion 14. Furthermore, due to usage of the connecting bolts, maintenance and replacement of after-mentioned coil 38 are facilitated.

Yoke portion 30 is formed at first surface 31 thereof with a coil accommodating groove 36 that has a generally triangular cross section sharpened in two stages toward the center of the torque converter. In coil accommodating groove 36, there is tightly installed a coil 38.

Energization of coil 38 is effected by two lead wires 38a that extend from opposed ends of coil 38 to two slip rings 28 that are disposed through an insulator on sleeve portion 27. Slidably contacting slip rings 28 are contact brushes 39 that are connected through lead wires to a power supplier (not shown) mounted on a fixed member.

It is to be noted that the sharpened bottom of coil accommodating groove 36 is not exposed to inner cylindrical surface 35 of yoke portion 30. That is, a thin wall is left between coil accommodating groove 36 and inner cylindrical surface 35, so that the magnetic viscous fluid does not leak.

In converter housing 10, there is defined a space near yoke portion 30 that is defined by yoke portion 30, turbine runner 5 and disc portion 13 of drive plate 12.

In the space, there is installed the above-mentioned magnetic force applying mechanism "MFAM" (or viscosity changer).

The mechanism "MFAM" comprises a first cylindrical plate 41. As shown, a right edge of first cylindrical plate 41 is secured to a first annular ring 40 that is secured to an inner cylindrical end of the above-mentioned smaller diameter portion 34 of yoke portion 30. As shown, a certain annular space is defined between inner cylindrical surface 35 of yoke portion 30 and first cylindrical plate 41.

A main body of first cylindrical plate 41 is made of a metal with a high magnetic permeability, such as iron or the like, while a center part 41a of the plate 41, that is directed toward the sharpened bottom of coil accommodating groove 36, is made of a metal with a low magnetic permeability, such as aluminum or the like. First annular ring 40 is also made of a metal with a low magnetic permeability.

Disc member 45 is formed with a disc portion 46, a second cylindrical plate portion 47 and a third cylindrical plate portion 49. Second and third cylindrical plate portions 47 and 49 are integrally connected to each other through an annular connecting ridge portion 48. Thus, second and third cylindrical plate portions 47 and 49 connected through annular connecting ridge portion 48 has a generally U-shaped cross section, as shown.

As is seen from FIG. 1, disc portion 46 of disc member 45 has a radially outside portion inclined toward the right.

Second cylindrical plate portion 47 is concentrically disposed within first cylindrical plate 41 keeping a given clearance therebetween and has a right end connected to an outer periphery of disc member 45.

Third cylindrical plate portion 49 is concentrically disposed between inner cylindrical surface 35 of yoke portion 30 and first cylindrical plate 41 while leaving respective spaces from the surface 35 and first cylindrical plate 41. Third cylindrical plate portion 49 has a left end connected to the left end of second cylindrical plate 47 through annular connecting ridge portion 48.

Preferably, the three annular spaces defined between inner cylindrical surface 35 of yoke portion 30 and first cylindrical plate 41, between third cylindrical plate portion 49 and first cylindrical plate 41 and between first cylindrical plate 14 and second cylindrical plate portion 47 are the same in thickness.

Annular connecting ridge portion 48 and a middle part 49a of third cylindrical plate portion 49 that is directed toward the sharpened bottom of coil accommodating groove 36 are made of a metal with a low magnetic permeability.

It is thus to be noted that under operation of the torque converter 1, first cylindrical plate 41 rotates together with pump impeller 20, while a cylindrical unit (47, 48, 49) including second and third cylindrical plate portions 47 and 49 and annular connecting ridge portion 48 rotates together with turbine runner 5. During these rotations, there is no mechanical contact between first cylindrical plate 41 and the cylindrical unit (47, 48, 49).

It is further to be noted that upon energization of coil 38, an effective magnetic circuit is established by yoke portion 30, third cylindrical plate portion 49, first cylindrical plate 41 and second cylindrical plate portion 47, and thus, by controlling energization of coil 38, an apparent viscosity (or yield stress) of the magnetic viscous fluid filled in each of the three annular spaces provided between inner cylindrical surface 35 of yoke portion 30 and second cylindrical plate portion 47 can be controlled.

In the following, the apparent viscosity shall be simply referred to as "viscosity" for simplicity.

The above-mentioned magnetic force applying mechanism "MFAM" is configured on the basis of the finding obtained from an experimental simulation of models that will be explained hereinbelow.

FIGS. 2A, 2B and 2C are schematically illustrated enlarged sectional views of three simulation models that were used in the experiment.

In Model (A) in FIG. 2A, a magnetic body block 70 was arranged to face to one surface (opposite surface 61) of a yoke 60 leaving a given space "d" therebetween. Yoke 60 was constructed to surround coil 38 with an iron material having a rectangular outer section. Magnetic body block 70 was also made of an iron material.

As shown, magnetic body block 70 has a substantially inverted triangular cross section with a certain width on its upper part and has an upper surface having its wide area opposed to the opposite surface 61 of yoke 60 in parallel. However, as shown, the width of the upper surface of magnetic body block 70 is smaller than that of opposite surface 61 of yoke 60.

As shown, coil 38 has a generally triangular cross section sharpened in two stages similar to the above-mentioned coil 38 practically received in coil accommodating groove 36 (see FIG. 1). A bottom surface 65 of the coil accommodating groove defines the sharpened distal end and forms a parallel surface leaving a thin wall between opposite surface 61 and the distal end.

As is mentioned hereinabove, coil 38 has a generally triangular cross section sharpened in two stages toward opposite surface 61 of magnetic body block 70.

With such sharpened shape, upon energization of coil 38, a large amount of magnetic flux "J" generated by coil 38 crossed a space G (thickness is d) defined between yoke 60 and magnetic body block 70.

Specification and size of coil 38, yoke 60 and magnetic body block 70 were set to be equivalent those practically used in a motor vehicle. Magnetic body block 70 corresponds to a head portion of disc member 45.

Model (B) in FIG. 2B was obtained by modifying the above-mentioned Model (A) with respect to the unit as shown in FIG. 1, that includes third cylindrical plate portion 49, first cylindrical plate 41, second cylindrical plate portion 47 and annular connecting ridge portion 48.

In Model (B), from a lower end of a side wall 62 extending perpendicular from a right end of opposite surface 61 of yoke 60, there extends a first cylindrical plate corresponding portion 63 in a leftward direction in parallel with opposite surface 61.

Magnetic body block 70A was produced by cutting off a given part of an upper portion of magnetic body block 70 of Model (A) from a right side surface to produce a deep lateral recess "K" into which the first cylindrical plate corresponding portion 63 can be received. An upper wall of the deep lateral recess "K" is formed to serve as a third cylindrical plate corresponding portion 73 that has the same thickness as first cylindrical plate corresponding portion 63.

Third cylindrical plate corresponding portion 73 is connected to a block main part 71 of magnetic body block 70A through a side wall 72. The bottom surface of the deep lateral recess "K" is in parallel with opposite surface 61 of yoke 60.

Magnetic body block 70A corresponds to the unit that includes, as is seen from FIG. 1, third cylindrical plate portion 49, first cylindrical plate 41, second cylindrical plate portion 47, annular connecting ridge portion 48 and disc member 45. The block main body 71 corresponds to a unit that includes second cylindrical plate portion 47 and disc portion 46.

Spaces defined between opposite surface 61 of yoke 60 and third cylindrical plate corresponding portion 73, between third cylindrical plate corresponding portion 73 and first cylindrical plate corresponding portion 63, and between first cylindrical plate corresponding portion 63 and the upper surface of block main body 71 are denoted by G1, G2, and G3 respectively and the thicknesses of these spaces G1, G2 and G3 are the same as that of the above-mentioned space "d" (see Model (A)). Other configurations are the same as those of Model (A).

Model (C) in FIG. 2C was obtained by modifying the above-mentioned Model (B) with respect to a magnetic permeability. That is, respective intermediate parts 68 and 78 of first cylindrical plate corresponding portion 63 and third cylindrical plate corresponding portion 73 that are placed to face the sharpened bottom surface 65 of the coil receiving groove are made of an aluminum with a low magnetic permeability, and a side wall 62A connecting first cylindrical plate corresponding portion 63 to yoke 60 and a side wall 72A connecting third cylindrical plate corresponding portion 73 to block main body 71 are similarly made of an aluminum. Other configurations are the same as those of Model (B).

The test was applied to these three Models (A), (B) and (C) under the same condition. That is, energization of coil 38 was carried out in each of Models (A), (B) and (C) to examine whether leakage of magnetic flux "J" to the outside occurs or not.

When coils 38 of these Models (A), (B) and (C) were energized, each Model (A), (B) or (C) showed a closed magnetic circuit. That is, as is seen from Model (A) for example, upon energization of coil 38, the produced magnetic circuit was closed between yoke 60 and magnetic body block 70 without showing a leak of magnetic flux therefrom, as will be understood from the flow of the magnetic flux "J". That is, the magnetic flux was almost completely confined within an area defined by yoke 60 and magnetic body block 70. This type of closed magnetic circuit was also produced in Model (B) and Model (C) as is seen from FIGS. 2(B) and 2(C).

The thickness of the bottom wall 65' (see FIG. 2(A)) is small, and thus the amount of magnetic flux "J" passing through the bottom wall 65' is quite small, and most of magnetic flux "J" crosses the magnetic viscous fluid over a wide range excluding the parallel surface region sandwiched by bottom wall 65' and opposite surface 61 and flows to magnetic body block 70 (71).

In the following, detailed observation will be directed to differences of the flow of magnetic flux "J" in case of the three Models (A), (B) and (C).

In case of Model (A), the magnetic flux J crosses the space G over the entire width of the upper surface of magnetic body block 70 that faces to yoke 60. Thus, the magnetic viscous fluid placed in the space G is magnetized to cause change of the viscosity of the fluid.

In case of Model (B), although a small amount of magnetic flux "J" flows through side wall 62 that connects yoke 60 to first cylindrical plate corresponding portion 63 and side wall 72 that connects third cylindrical plate corresponding portion 73 to block main body 71, most of magnetic flux "J" crosses the space G1 from opposite surface 61 of yoke 60 and flows through the entire width of third cylindrical plate corresponding portion 73.

In the space G1, the magnetic flux 3 flows perpendicularly from opposite surface 61 over a shortest distance. However, the flux is inclined in a direction of flowing through the plate portion in third cylindrical plate corresponding portion 73 and first cylindrical plate corresponding portion 63, and thus, the magnetic flux "J" crossing the subsequent spaces G2 and G3 is sequentially decreased each time the flux flows through third cylindrical plate corresponding portion 73 and first cylindrical plate corresponding portion 63.

However, since in Model (B) the magnetic flux J crosses the three (viz., a large number of) spaces G1, G2, and G3 as compared with Model (A), a larger amount of the magnetic viscous fluid can be magnetized in Model (B).

In case of Model (C), the magnetic flux does not flow into side wall 62A that connects yoke 60 to first cylindrical plate corresponding portion 63 and furthermore the magnetic flux does not flow into side wall 72A that connects third cylindrical plate corresponding portion 73 to block main body 71. Thus, the density of the magnetic flux "J" crossing the space G1 from opposite surface 61 of yoke 60 and flowing through third cylindrical plate corresponding portion 73 is increased by a certain amount.

Moreover, intermediate parts 78 and 68 of third cylindrical plate corresponding portion 73 and first cylindrical plate corresponding portion 63 show a low magnetic permeability and thus hinder a flow of the magnetic flux along the plate surfaces, and thus, most of the magnetic flux "J" having flowed into third cylindrical plate corresponding portion 73 crosses the space G2 and flows to first cylindrical plate corresponding portion 63, and most of the magnetic flux "J" having sequentially flowed into first cylindrical plate corresponding portion 63 also crosses the space G3 and flows to block main body 71. Since the magnetic flux having flowed into block main body 71 does not meet an intermediate part with a small magnetic permeability, the magnetic flux flows in block main body 71 to close the magnetic circuit. Thus, the magnetic flux is suppressed from leaking to the outside.

Therefore, in case of Model (C), the density of the magnetic flux "J" crossing each of the spaces G1, G2, and G3 filled with the magnetic viscous fluid is higher than that in Model (B). Thus, in case of Model (C), a higher magnetization of the magnetic viscous fluid is achieved and a larger viscosity change of the fluid is achieved.

The above-mentioned experimental simulation of the three Models (A), (B) and (C) brought about a practical difference in transmission torque.

That is, the maximum transmission torques obtained by Models (A), (B) and (C) were 71.5 Nm, 86.9 Nm and 111.4 Nm.

If these transmission torques are properly selected in accordance with the weight and driving torque of a vehicle, a sufficient lock-up condition can be assuredly established in an associated torque converter.

Referring back to FIG. 1, the magnetic force applying mechanism "MFAM" is arranged in a space separated from turbine runner 5 in converter housing 10 both in the radial direction and in the axial direction and separated from the circulation path of the working fluid (viz., magnetic viscous fluid) provided between pump impeller 20 and turbine runner 5.

The magnetic flux "J" produced in magnetic force applying mechanism "MFAM" forms a closed magnetic circuit between the yoke side portion (viz., yoke portion 30 and first cylindrical plate portion 41 extending from yoke portion 30) and a portion opposite to the yoke side portion of disc member 45 (viz., second cylindrical plate portion 47 and third cylindrical plate portion 49) and thus the magnetic flux "J" is suppressed from leaking to the outside. Thus, the magnetic viscous fluid in the circulation path is not affected.

Since torque converter 1 is equipped with the above-described magnetic force applying mechanism "MFAM" (viz., viscosity changer), reliable lockup condition is realized by the torque converter 1 without affecting the circulation flow "B" of the magnetic viscous fluid.

The torque converter of the invention is configured as mentioned above, and in the torque converter using the magnetic viscous fluid, in the converter housing 10, yoke portion 30 connected to pump impeller 20 and provided with coil 38 as well as first cylindrical plate portion 41 and second cylindrical plate portion 47 connected to turbine runner 5 and third cylindrical plate portion 49 are opposed to each other with a predetermined space left between them and arranged alternately outside the circulation path of the magnetic viscous fluid between pump impeller 20 and turbine runner 5 so as to constitute the magnetic force applying mechanism "MFAM", and the magnetic circuit is formed by supplying electric power to coil 38 through yoke portion 30 and each of cylindrical plate portions 41, 47, and 49 and thus, the viscosity of the magnetic viscous fluid present in the spaces between the yoke portion and each of the cylindrical plate portions is efficiently changed by the control of the electric power, and a slip between the pump impeller and the turbine runner is eliminated, when needed, so as to realize a lockup condition.

While the viscosity of the magnetic viscous fluid in the spaces between yoke portion 30 and each of cylindrical plate portions 41, 47, and 49 is being changed, the magnetic flux in the magnetic circuit does not affect the magnetic viscous fluid in the separated circulation path and thus, the torque amplification function possessed by the circulation flow is not deteriorated.

Yoke portion 30 and each of cylindrical plate portions 41, 47 and 49 form a mutually overlapping hollow cylindrical shape, and it is particularly easy to form a plurality of spaces between each of them.

Moreover, since each of first and third cylindrical plate portions 41 and 49 has parts 41a and 49a with a small magnetic permeability to prevent the flow of the magnetic flux along the respective cylindrical surface, the density of the magnetic flux crossing each space is increased, and the lockup function is further improved.

Moreover, opposite portions of yoke portion 30 and each of cylindrical plate portions 41 and 47 are arranged outside in the radial direction of the circulation path and arranged to face each other in the radial direction as described above, and thus, the center of gravity of the magnetic force applying mechanism "MFAM" is located away from the rotating shaft of the torque converter, and a large rotation inertia force is generated, and particularly during lockup, stable rotation with less fluctuation can be obtained.

In the above-mentioned embodiment, there is employed the magnetic force applying mechanism "MFAM" in which first cylindrical plate 41, second cylindrical plate portion 47 and third cylindrical plate portion 49 are concentrically arranged in the radial direction. However, if desired, each of the cylindrical plate and portions that constitute the magnetic force applying mechanism "MFAM" may be arranged in the axial direction as long as they are arranged independently from the circulation path for the working fluid.

The entire contents of Japanese Patent Application 2011-234775 filed Oct. 26, 2011 are incorporated herein by reference.

Although the invention has been described above with reference to an embodiment of the invention, the invention is not limited to such embodiment as described above. Various modifications and variations of such embodiment may be carried out by those skilled in the art, in light of the above description.

What is claimed is:

1. A torque converter for performing torque transmission by circulating a working fluid between a pump impeller and a turbine runner, characterized in that:
    the working fluid is a magnetic viscous fluid;
    in a torque converter housing, outside a circulation path of the working fluid, a yoke member connected to the pump impeller and provided with a coil and a magnetic member connected to the turbine runner are concentrically arranged with a predetermined space kept therebetween; and
    a magnetic circuit is established between the yoke member and the magnetic member upon energization of the coil.

2. A torque converter as claimed in claim 1, in which the yoke member and the magnetic member are concentrically arranged in such a manner that a plurality of the spaces are formed between the yoke member and the magnetic member.

3. A torque converter as claimed in claim 2, in which the yoke member and the magnetic member are each provided with a member with a small magnetic permeability in order to prevent a flow of a magnetic flux along the respective cylindrical surfaces.

4. A torque converter as claimed in claim 1, in which mutually opposed portions of the yoke member and the magnetic member are arranged outside in the radial direction from the circulation path, and in which the yoke member and the magnetic member are opposed to each other in the radial direction.

5. A torque converter comprising:
    a converter housing adapted to be connected to a power source to be driven;
    a pump impeller constituting part of the converter housing, the pump impeller having an annular yoke member that constitutes a cylindrical outer body portion of the converter housing;
    a turbine runner rotatably installed in the converter housing and adapted to be connected to a transmission device, the turbine runner being arranged to face the pump impeller;
    a magnetic viscous fluid filled in the converter housing and serving as a working fluid, the magnetic viscous fluid being circulated between the pump impeller and the turbine runner for performing torque transmission therebetween; and
    a magnetic force applying mechanism for changing a viscosity of the magnetic viscous fluid by applying the fluid with a magnetic force, the magnetic force applying mechanism being installed in the converter housing at a position outside a circulation path of the magnetic viscous fluid, the magnetic force applying mechanism comprising:
        a coil concentrically held by the annular yoke member; and
        an annular plate unit of magnetic material concentrically installed inside the coil and connected to the turbine runner through a disc member,
        wherein upon energization of the coil, there is produced a magnetic circuit between the annular yoke member and the annular plate unit.

6. A torque converter as claimed in claim 5, in which the magnetic force applying mechanism further comprises a cylindrical plate of magnetic material that is connected to the converter housing and concentrically installed inside the coil in the vicinity of the annular plate unit.

7. A torque converter as claimed in claim 6, in which the annular plate unit is shaped to have an annular recess into which the cylindrical plate is received while being spaced from an inner surface of the annular recess.

8. A torque converter as claimed in claim 7, in which the annular recess of the annular plate unit is defined by a second cylindrical plate portion, a third cylindrical plate portion and an annular connecting ridge portion through which the second and third cylindrical plate portions are connected.

9. A torque converter as claimed in claim 6, in which the annular plate unit and the cylindrical plate of the magnetic force applying mechanism have given portions that are low in magnetic permeability.

10. A torque converter as claimed in claim 5, in which the annular plate unit of the magnetic force applying mechanism has given portions that are low in magnetic permeability.

11. A torque converter as claimed in claim 5, in which the annular yoke member is formed with a coil accommodating groove for tightly receiving the coil.

12. A torque converter as claimed in claim 11, in which the coil accommodating groove has a generally triangular cross section sharpened in two stages toward the center of the torque converter.

13. A torque converter as claimed in claim 12, in which the annular plate unit of the magnetic force applying mechanism has, at a portion facing the sharpened end of the coil accommodating groove, a part that is low in magnetic permeability.

\* \* \* \* \*